(12) United States Patent
Brandt et al.

(10) Patent No.: US 12,427,745 B2
(45) Date of Patent: Sep. 30, 2025

(54) TEXTILE HAVING INSULATION ZONES AND PILE ZONES

(71) Applicant: NIKE, Inc., Beaverton, OR (US)

(72) Inventors: Baron C. Brandt, Portland, OR (US); Dallas Lund, Beaverton, OR (US); Andrea J. Staub, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 349 days.

(21) Appl. No.: 17/203,051

(22) Filed: Mar. 16, 2021

(65) Prior Publication Data

US 2021/0321701 A1    Oct. 21, 2021

Related U.S. Application Data

(60) Provisional application No. 63/013,047, filed on Apr. 21, 2020.

(51) Int. Cl.
*B32B 5/06* (2006.01)
*B32B 5/02* (2006.01)
(Continued)

(52) U.S. Cl.
CPC ............... *B32B 5/06* (2013.01); *B32B 5/022* (2013.01); *B32B 5/024* (2013.01); *B32B 5/275* (2021.05);
(Continued)

(58) Field of Classification Search
CPC .. B32B 5/067; B32B 5/06; B32B 5/26; B32B 5/275; B32B 7/05; B32B 2250/20;
(Continued)

(56) References Cited

U.S. PATENT DOCUMENTS 3,405,674 A * 10/1968 Coates .................... D04H 1/02
                                                     112/420
3,511,740 A *  5/1970 Sanders .................. D04H 1/48
                                                     442/352
(Continued)

FOREIGN PATENT DOCUMENTS

CA    1075449 A    4/1980
CN    1148417 A    4/1997
(Continued)

OTHER PUBLICATIONS

International Search Report and Written Opinion received for PCT Patent Application No. PCT/US2021/023079, mailed on Jun. 28, 2021, 4 pages.

(Continued)

*Primary Examiner* — Jennifer A Gillett
(74) *Attorney, Agent, or Firm* — SHOOK, HARDY & BACON L.L.P.

(57) ABSTRACT

Aspects herein are directed to a textile, and garments produced from the textile, having one or more insulation zones and one or more pile zones where the pile zones seamlessly extend from the insulation zones. The textile includes a first woven layer, a second woven layer, and a nonwoven layer positioned between the first and second woven layers. In the insulation zone, the first woven layer, the second woven layer, and the nonwoven layer are unaffixed from each other. In the pile zone, fibers/filaments from the nonwoven layer are entangled with fibers, filaments and yarns from each of the first woven layer and the second woven layer.

20 Claims, 6 Drawing Sheets

(51) Int. Cl.
*B32B 5/26* (2006.01)
*B32B 7/05* (2019.01)

(52) U.S. Cl.
CPC ............ *B32B 7/05* (2019.01); *B32B 2250/20* (2013.01); *B32B 2250/40* (2013.01); *B32B 2307/402* (2013.01); *B32B 2307/7265* (2013.01); *B32B 2437/00* (2013.01)

(58) Field of Classification Search
CPC ............ B32B 2250/40; B32B 230/304; A41D 31/065; D04H 13/005
See application file for complete search history.

(56) References Cited

U.S. PATENT DOCUMENTS

| | | | |
|---|---|---|---|
| 3,794,553 A * | 2/1974 | Lochner | D04H 1/498 428/96 |
| 4,583,247 A | 4/1986 | Fingerhut et al. | |
| 5,246,760 A * | 9/1993 | Krickl | B32B 5/06 52/408 |
| 5,443,893 A * | 8/1995 | Herzberg | B32B 5/06 442/364 |
| 5,458,944 A | 10/1995 | Austin | |
| 5,597,427 A | 1/1997 | Herzberg | |
| 6,473,910 B2 | 11/2002 | Creagan et al. | |
| 6,638,605 B1 | 10/2003 | Ankuda et al. | |
| 7,735,149 B2 | 6/2010 | Jarvis | |
| 7,886,367 B2 | 2/2011 | Chapuis et al. | |
| 8,286,262 B2 | 10/2012 | Rance et al. | |
| 9,233,520 B2 | 1/2016 | Kelsey | |
| 9,420,837 B2 | 8/2016 | Pezzimenti | |
| 9,949,524 B2 | 4/2018 | Lyttle et al. | |
| 10,166,746 B2 | 1/2019 | Kim | |
| 2006/0084343 A1 * | 4/2006 | Bonneh | D04H 3/14 442/341 |
| 2006/0143767 A1 | 7/2006 | Yang et al. | |
| 2007/0062638 A1 | 3/2007 | Carroll | |
| 2008/0102725 A1 | 5/2008 | Lacey et al. | |
| 2009/0258180 A1 * | 10/2009 | Goulet | A41D 31/08 428/72 |
| 2017/0172240 A1 * | 6/2017 | Massey | B32B 5/26 |
| 2018/0098584 A1 | 4/2018 | Pezzimenti et al. | |
| 2018/0352883 A1 | 12/2018 | Schlee et al. | |
| 2019/0110529 A1 | 4/2019 | Yamada | |
| 2019/0269188 A1 * | 9/2019 | Ridley | B32B 5/022 |
| 2019/0281909 A1 | 9/2019 | Rock et al. | |

FOREIGN PATENT DOCUMENTS

| | | |
|---|---|---|
| CN | 1184513 A | 6/1998 |
| CN | 207466016 U | 6/2018 |
| CN | 109788815 A | 5/2019 |
| DE | 19804940 A1 | 8/1999 |
| EP | 3168039 A1 | 5/2017 |
| JP | 02-066233 U | 5/1990 |
| WO | 80/01086 A1 | 5/1980 |
| WO | 96/28597 A1 | 9/1996 |
| WO | 2017/188162 A1 | 11/2017 |
| WO | 2018/067676 A1 | 4/2018 |

OTHER PUBLICATIONS

International Preliminary Report on Patentability received for PCT Patent Application No. PCT/US2021/023079, mailed on Nov. 3, 2022, 7 pages.
Adicross No-show Transition Polo Shirt, Amazon.com, Available online at: <https://www.amazon.com/adidas-Golf-Adicross-No-Show-Transition/dp/B07DVXQTX8>, Jan. 22, 2020, 1 page.
Bossini Metropolitan Men Stay Dry Seamless—Sport Tee, Amazon.com, Available online at <https://www.amazon.com/stores/bossini/Shirts_Men/page/3ABB619F-3A79-40AD-9302-75D3A9A64E31?productGridPageIndex=3>, May 14, 2019, 5 pages.
Zensah Women Run Seamless Long Sleeve Running Shirt, Amazon.com Available online at: <https://www.amazon.com/Zensah-Run-Seamless-SS-Top/dp/B00WODETGM>, Dec. 15, 2014, 6 pages.
Office Action received for European Patent Application No. 23215147.2, mailed on Jan. 4, 2024, 2 pages.
Intention to Grant received for European Patent Application No. 21718351.6, mailed on Aug. 21, 2023, 6 pages.
Database WPI Week 201843 Thomson Scientific, London, GB; AN 2018-469164-& CN 207 466 016 U (Qingdao Xinwei Textile Dev Co LTD) Jun. 8, 2018.
European search report received for European Application No. 23215147.2, mailed on Mar. 11, 2024, 9 pages.
Office Action received for Canadian Patent Application No. 3,177,370, mailed on Feb. 14, 2024, 3 pages.
Office Action received for European Application No. 23215147.2, mailed on Nov. 13, 2024, 5 pages.

* cited by examiner

FIG. 8 ically relate to a textile, and garments formed the textile, having insulation zones and pile zones formed from a combination of woven layers and nonwoven layers.

TEXTILE HAVING INSULATION ZONES AND PILE ZONES

CROSS-REFERENCE TO RELATED APPLICATIONS

This application, Ser. No. 17/203,035 and titled "Textile Having Insulation Zones and Pile Zones," claims the benefit of priority of U.S. Prov. App. No. 63/013,047, filed Apr. 21, 2020, and titled "Textile Having Insulation Zones and Pile Zones." The entirety of the aforementioned application is incorporated by reference herein.

TECHNICAL FIELD

Aspects herein relate to a textile, and garments formed the textile, having insulation zones and pile zones formed from a combination of woven layers and nonwoven layers.

BACKGROUND

Traditional garments that include, for example, insulation zones and pile zones are generally formed using a panel-type, cut-and-sew construction where seams are used to affix the textiles that form the insulation zones with the textiles that form the pile zones. The seam lines may introduce areas of structural weakness, may be aesthetically undesirable, and/or may cause chaffing or discomfort for wearers.

SUMMARY

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1. A textile comprising: an insulation zone comprising a first woven layer, a second woven layer, and a nonwoven layer positioned between the first woven layer and the second woven layer, each of the first woven layer and the second woven layer being unaffixed from the nonwoven layer in the insulation zone; and a pile zone seamlessly extending from the insulation zone, the pile zone comprising the first woven layer, the second woven layer, and the nonwoven layer positioned between the first woven layer and the second woven layer, wherein fibers and/or filaments from the nonwoven layer are entangled with fibers, filaments, and/or yarns from each of the first woven layer and the second woven layer such that the first woven layer and the second woven layer are bound to the nonwoven layer in the pile zone.

Clause 2. The textile according to clause 1, wherein the nonwoven layer comprises two or more nonwoven sheets, and wherein fibers and/or filaments from each of the two or more nonwoven sheets are entangled with each other.

Clause 3. The textile according to clause 2, wherein a first nonwoven sheet of the two or more nonwoven sheets comprises a first visual property, and wherein a second nonwoven sheet of the two or more nonwoven sheets comprises a second visual property different from the first visual property.

Clause 4. The textile according to clause 3, wherein the first visual property comprises a first color, and wherein the second visual property comprises a second color.

Clause 5. The textile according to any of clauses 3 through 4, wherein the first visual property comprises a first pattern, and wherein the second visual property comprises a second pattern.

Clause 6. The textile according to any of clauses 1 through 5, wherein the nonwoven layer has a weight from about 180 grams per square meter (gsm) to about 220 gsm.

Clause 7. A garment comprising: an insulation zone comprising a first woven layer, a second woven layer, and a nonwoven layer positioned between the first woven layer and the second woven layer, wherein the first woven layer, the second woven layer, and the nonwoven layer comprise separate and distinct layers in the insulation zone; and a pile zone seamlessly extending from the insulation zone, the pile zone comprising the first woven layer, the second woven layer, and the nonwoven layer, wherein fibers and/or filaments from the nonwoven layer are entangled with fibers, filaments, and/or yarns from each of the first woven layer and the second woven layer in the pile zone such that the first woven layer and the second woven layer are bound to the nonwoven layer in the pile zone.

Clause 8. The garment according to clause 7, wherein both of the first woven layer and the second woven layer are unaffixed from the nonwoven layer in the insulation zone.

Clause 9. The garment according to any of clauses 7 through 8, wherein the nonwoven layer has a visual property different from a visual property of one or more of the first woven layer and the second woven layer.

Clause 10. The garment according to any of clauses 7 through 9, wherein the nonwoven layer comprises two or more nonwoven sheets, and wherein fibers and/or filaments from each of the two or more nonwoven sheets are entangled with each other.

Clause 11. The garment according to clause 10, wherein a first nonwoven sheet of the two or more nonwoven sheets comprises a first visual property, and wherein a second nonwoven sheet of the two or more nonwoven sheets comprises a second visual property different from the first visual property.

Clause 12. The garment according to any of clauses 7 through 11, wherein the nonwoven layer has a weight from about 180 grams per square meter (gsm) to about 220 gsm.

Clause 13. The garment according to any of clauses 7 through 12, wherein the insulation zone is positioned on the garment in areas corresponding to high heat loss areas of a wearer when the garment is in an as-worn configuration.

Clause 14. A method of manufacturing a textile comprising: positioning a nonwoven layer between a first woven layer and a second woven layer to form a layered construction; and entangling fibers and/or filaments from the nonwoven layer with fibers, filaments, and/or yarns from each of the first woven layer and the second woven layer in a first area of the layered construction, wherein each of the first woven layer and the second woven layer remain unaffixed from the nonwoven layer in a second area of the layered construction.

Clause 15. The method of manufacturing the textile according to clause 14, wherein the nonwoven layer is formed by positioning two or more nonwoven sheets adjacent to each other and entangling fibers and/or filaments from each of the two or more nonwoven sheets with each other using an entanglement process.

Clause 16. The method of manufacturing the textile according to clause 15, wherein the entanglement process is executed in a direction from a first surface of the nonwoven layer toward a second surface of the nonwoven layer, and in a direction from the second surface of the nonwoven layer toward the first surface of the nonwoven layer.

Clause 17. The method of manufacturing the textile according to any of clauses 14 through 16, wherein entangling the fibers and/or filaments from the nonwoven layer with the fibers, filaments, and/or yarns from each the first woven layer and the second woven layer comprises: positioning the first woven layer adjacent to a first surface of the nonwoven layer; executing a first entanglement process in a direction from the nonwoven layer toward the first woven layer; subsequently positioning the second woven layer adjacent to a second opposite surface of the nonwoven layer; and executing a second entanglement process in a direction from the first woven layer toward the second woven layer.

Clause 18. The method of manufacturing the textile according to any of clauses 14 through 17, wherein the nonwoven layer has a weight from about 180 grams per square meter (gsm) to about 220 gsm.

Clause 19. The method of manufacturing the textile according to any of clauses 14 through 18, wherein the nonwoven layer has a visual property different from a visual property of one or more of the first woven layer and the second woven layer.

Clause 20. The method of manufacturing the textile according to clause 19, wherein the visual property of the nonwoven layer and the one or more of the first woven layer and the second woven layer comprises color.

BRIEF DESCRIPTION OF THE DRAWINGS

Examples of aspects herein are described in detail below with reference to the attached drawing figures, wherein.

DETAILED DESCRIPTION

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Traditional articles of apparel that have insulation zones and pile zones (i.e., fleece-like zones) are generally formed using a panel-type, cut-and-sew construction where textiles used to form the insulation zone are seamed to textiles used to form the pile zone. The resultant seams may introduce areas of structural weakness, may create an undesirable aesthetic, and/or may cause chaffing or discomfort to a wearer. As well, textiles used to form traditional pile zones may lack features that make the textiles suitable for use in adverse weather conditions such as rain, snow, and/or wind.

Aspects herein are directed to a textile, garments formed from the textile, and methods of manufacturing the textile, where the textile has an insulation zone and a pile zone that seamlessly extend from one another. As well, due to the construction of the pile zone, the pile zone includes features that make it more resistant to adverse weather conditions than typical pile textiles. In example aspects, the insulation zone includes a first woven layer, a second woven layer, and a nonwoven layer positioned in a space between the first woven layer and the second woven layer. In the insulation zone, the first woven layer, the second woven layer, and the nonwoven layer are unaffixed from each other such that the first woven layer, the second woven layer, and the nonwoven layer are separate and distinct layers. In addition to the spaces formed between the different layers which may be used to trap heated air, the nonwoven layer includes a large number of spaces between the fibers and filaments that form the nonwoven layer which further helps to trap heated air and insulate a wearer.

The pile zone includes the first woven layer, the second woven layer, and the nonwoven layer. In the pile zone, fibers/filaments from the nonwoven layer extend into and through the first woven layer and the second woven layer and are entangled with fibers, filaments, and/or yarns from both the first woven layer and the second woven layer through, for example, an entanglement process such as, for example, needlepunching. Because of the entanglement of the nonwoven fibers/filaments with the first woven layer and the second woven layer, the first and second woven layers are bound or secured to the nonwoven layer in the pile zone. The pile zone has a fleece-like texture due to the fibers/filaments from the nonwoven layer extending through the first woven layer and the second woven layer. Unlike typical pile textiles in which tufts or loops integrally extend from a base textile which may not exhibit weather-resistant properties, the pile zone contemplated herein may have weather-resistant properties due to the presence of the first woven layer and the second woven layer. For instance, in example aspects where the first woven layer and the second woven layer are tightly woven, the pile zone may exhibit wind-resistant properties. In additional example aspects where one or more of the first woven layer and the second woven layer are treated with a durable water repellant, the pile zone may be generally resistant to rain or precipitation.

Although the insulation zone and the pile zone are formed from the same materials, aspects herein contemplate having a varied aesthetic between the insulation zone and the pile zone based on, for example, the entanglement process. For example, the first and/or second woven layers may have a first visual property. The nonwoven layer may have a second visual property different from the first visual property. In this aspect, the insulation zone may primarily exhibit or display the first visual property associated with the first and/or second woven layer since the nonwoven layer is positioned between the first and second woven layers and may not be visible. The pile zone, due to the entanglement of the fibers and filaments of the nonwoven layer with the fibers, filaments, and yarns of the first and/or second woven layers may exhibit or display a different visual property that is intermediate between the first visual property and the second visual property. Using an example, the first and/or second woven layers may be white in color and the nonwoven layer may be grey in color. The insulation zone may primarily exhibit or display a white color, and the pile zone may have a heather grey and white appearance due to the mixture of the white yarns forming the first and/or second woven layers with the grey fibers/filaments forming the nonwoven layer.

As used herein, the term "garment" encompasses any number of products meant to be worn by a wearer including upper-body garments (e.g., shirts, jackets, hoodies, tank tops, pullovers), lower-body garments (e.g., pants, shorts, leggings), articles of footwear such as shoes or socks, articles of headwear (e.g., hats), gloves, sleeves (e.g., arm sleeves, calf sleeves), and the like. Positional terms used when describing the garment such as front, back, inner-facing surface, outer-facing surface, and the like are with respect to the garment being worn as intended with the wearer standing upright. As such, when the garment is in the form of an upper-body garment, the front of the upper-body garment is configured to cover, for instance, a front upper torso area and a front arm area (when the garment has sleeves), and the back of the upper-body garment is configured to cover a back upper torso area and a back arm area (when the garment has sleeves). When the garment is in the form of a lower-body garment, the front of the lower-body garment is configured to cover, for instance, a front lower torso area and a front leg area of the wearer, and the back of the lower-body garment is configured to cover a back lower torso area and a back leg area. Similarly, the inner-facing surface of the garment is configured to face inwardly (e.g., toward a body surface of a wearer), and the outer-facing surface of the garment is configured to face toward the external environment or away from the inner-facing surface of the garment. It is contemplated herein that, in some aspects, the inner-facing surface of the garment may comprise the innermost-facing surface of the garment. In some aspects, the outer-facing surface of the garment may comprise the outermost-facing surface of the garment.

The term "yarn" as used herein may mean an assemblage of fibers or filaments that are twisted or laid together so as to form a continuous strand. The term "yarn" may also encompass a single monofilament that forms a continuous strand. In example aspects, the first and second woven layers described herein may be formed from yarns and the fibers or filaments that form the yarns. The nonwoven layer described herein may be formed from fibers and/or filaments.

The term "woven layer" means a textile having a plurality of warp yarns and a plurality of weft yarns interwoven with the plurality of warp yarns, where the plurality of weft yarns extend generally orthogonal to the plurality of warp yarns. The term "nonwoven layer" as used herein refers to fibers or filaments that are held together by mechanical and/or chemical interactions without being in the form of a knit, woven, braided construction, or other structured construction. In a particular aspect, the nonwoven textile includes a collection of fibers or filaments that are mechanically manipulated to form a mat-like material. Stated differently nonwoven textiles are directly made from fibers or filaments. The term "pile" or "pile zone" as used herein means a textile, including a composite textile, having a raised surface formed from upright loops or strands of fibers/filaments.

The term "seamlessly extend" means two areas or zones that extend from one another without seams. With respect to the present disclosure, the insulation zone and the pile zone seamlessly extend from one another such that one or more warp yarns and/or a weft yarns in the insulation zone continuously and without interruption extend into the pile zone.

The term "visual property" as used herein broadly means the visual impression created by a textile. This may be due to different characteristic of the yarns/fibers/filaments used to form the textile including differences in texture, denier, shine, color, and the like. With respect to the term "pattern," the term generally means a repeated decorative design. With respect to the term "color," the term generally relates to a color of a textile that may be afforded by dyes and/or colorants. Moreover, the term "color" when describing, for example, a textile means an observable color of yarns/fibers/filaments that form the textile. Such aspects contemplate that a color may be any color that may be afforded to yarns/fibers/filaments using dyes, pigments, and/or colorants that are known in the art. As such, yarns/fibers/filaments may be configured to have a color including, but not limited to red, orange, yellow, green, blue, indigo, violet, white, black, and shades thereof.

Aspects related to a color further contemplate determining if one color is different from another color. In these aspects, a color may comprise a numerical color value, which may be determined by using instruments that objectively measure and/or calculate color values of a color of an object by standardizing and/or quantifying factors that may affect a perception of a color. Such instruments include, but are not limited to spectroradiometers, spectrophotometers, and the like. Thus, aspects herein contemplate that a "color" of a textile provided by yarns/fibers/filaments may comprise a numerical color value that is measured and/or calculated using spectroradiometers and/or spectrophotometers. Moreover, numerical color values may be associated with a color space or color model, which is a specific organization of colors that provides color representations for numerical color values, and thus, each numerical color value corresponds to a singular color represented in the color space or color model.

In these aspects, a color may be determined to be different from another color if a numerical color value of each color differs. Such a determination may be made by measuring and/or calculating a numerical color value of, for instance, a first textile having a first color with a spectroradiometer or a spectrophotometer, measuring and/or calculating a numerical color value of a second textile having a second color with the same instrument (i.e., if a spectrophotometer was used to measure the numerical color value of the first color, then a spectrophotometer is used to measure the numerical color value of the second color), and comparing the numerical color value of the first color with the numerical color value of the second color. In another example, the determination may be made by measuring and/or calculating a numerical color value of a first area of a textile with a spectroradiometer or a spectrophotometer, measuring and/or calculating a numerical color value of a second area of the textile having a second color with the same instrument, and comparing the numerical color value of the first color with the numerical color value of the second color. If the numerical color values are not equal, then the first color is different than the second color, and vice versa.

Further, it is also contemplated that a visual distinction between two colors may correlate with a percentage difference between the numerical color values of the first color and the second color, and the visual distinction will be greater as the percentage difference between the color values increases. Moreover, a visual distinction may be based on a comparison between colors representations of the color values in a color space or model. For instance, when a first color has a numerical color value that corresponds to a represented color that is black or navy and a second color has a numerical color value that corresponds to a represented color that is red or yellow, a visual distinction between the first color and the second color is greater than a visual distinction between a first color with a represented color that is red and a second color with a represented color that is yellow.

Unless otherwise noted, all measurements provided herein are measured at standard ambient temperature and pressure (25 degrees Celsius or 298.15 K and 1 bar).

Figure 1:
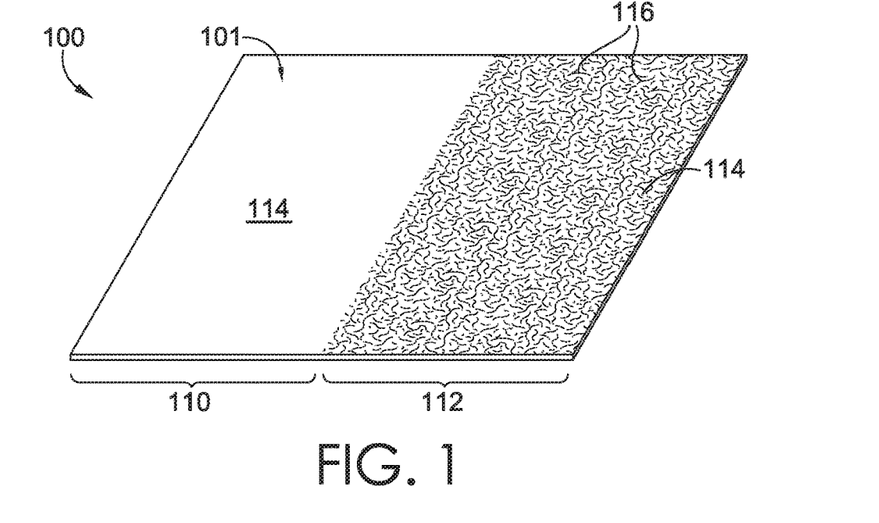
FIG. 1 illustrates a view of a first surface of an example textile having an insulation zone and a pile zone in accordance with aspects herein.
Figure 2:
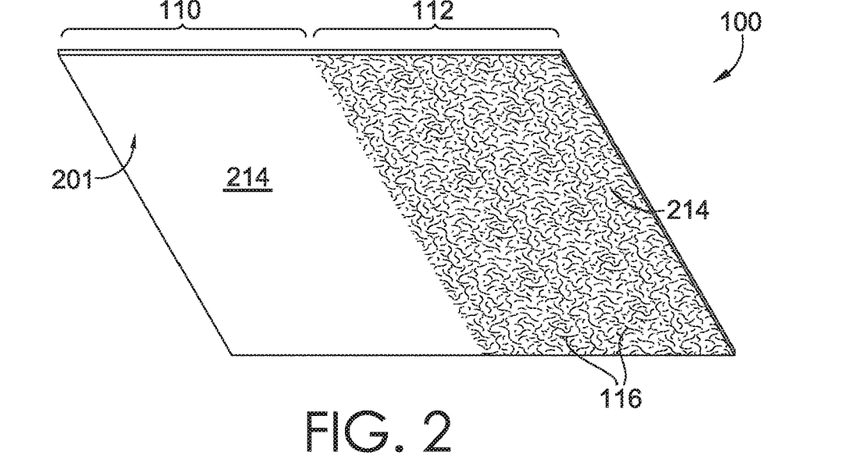
FIG. 2 illustrates a view of a second opposite surface of the example textile of FIG. 1 and depicts the insulation zone and the pile zone in accordance with aspects herein.

FIGS. 1 and 2 respectively depict a view of a first surface 101 and a second opposite surface 201 of an example textile 100. The textile 100 includes an insulation zone 110 and a pile zone 112. With respect to FIG. 1, the first surface 101 of the insulation zone 110 is formed from a first woven layer 114. The first woven layer 114, in example aspects, may include nylon yarns, polyester yarns, a combination of nylon yarns and polyester yarns, and the like. When the textile 100 is incorporated into a garment, the first woven layer 114 of the insulation zone 110 may form an outermost-facing surface of the garment. In example aspects, the first woven layer 114 may be tightly woven such that the first woven layer 114 is generally resistant to wind penetration and/or rain penetration. Having a tightly woven first woven layer 114 also helps to maintain heated air in the space between the first woven layer 114 and the second woven layer. In further example aspects, the first woven layer 114 may be treated with a durable water repellant finish to enhance the water-resistant or repellant properties of the first woven layer 114. The first woven layer 114 may have a visual property such as a color or a pattern.

The first surface 101 of the pile zone 112 is formed from the first woven layer 114 and fibers/filaments 116 of a nonwoven layer that is positioned between the first woven layer 114 and the second woven layer as discussed below. The fibers/filaments 116 of the nonwoven layer extend through the first surface 101 in the pile zone 112 such that the fibers/filaments 116 of the nonwoven layer extend outwardly (i.e., in a positive z-direction) from a surface plane of the first woven layer 114. This configuration imparts a fleece-like texture to the pile zone 112. Due to the presence of the first woven layer 114, the pile zone 112 may also exhibit wind and rain resistant properties while providing a pleasing hand feel and a fleece-like aesthetic.

With respect to FIG. 2, the second surface 201 of the insulation zone 110 is formed from a second woven layer 214. The second woven layer 214, in example aspects, may include nylon yarns, polyester yarns, a combination of nylon yarns and polyester yarns, and the like. When the textile 100 is incorporated into a garment, the second woven layer 214 of the insulation zone 110 may form an innermost-facing surface of the garment. Similar to the first woven layer 114, the second woven layer 214 may be tightly woven such that heated air trapped in the space between the first woven layer 114 and the second woven layer 214 is generally retained in the space to help warm or insulate a wearer. The second woven layer 214 may also have a visual property such as a color or a pattern. The visual property of the second woven layer 214 may be the same or different from the visual property of the first woven layer 114.

The second surface 201 of the pile zone 112 is formed from the second woven layer 214 and the fibers/filaments 116 of the nonwoven layer that is positioned between the first woven layer 114 and the second woven layer 214. The fibers/filaments 116 of the nonwoven layer extend through the second surface 201 in the pile zone 112 such that the fibers/filaments 116 of the nonwoven layer extend outwardly (i.e., in a negative z-direction with respect to the fibers/filaments 116 extending through the first surface 101) from a surface plane of the second woven layer 214 to impart a fleece-like texture to the second surface 201 of the pile zone 112. As shown, the location of the pile zone 112 on the first surface 101 of the textile 100 corresponds to the location of the pile zone 112 on the second surface 201 of the textile 100. Similarly, the location of the insulation zone 110 on the first surface 101 of the textile 100 corresponds to the location of the insulation zone 110 on the second surface 201 of the textile 100. Stated differently the insulation zone 110 and the pile zone 112 are symmetrically located on the opposing surfaces 101 and 201 of the textile 100.

Figure 3:
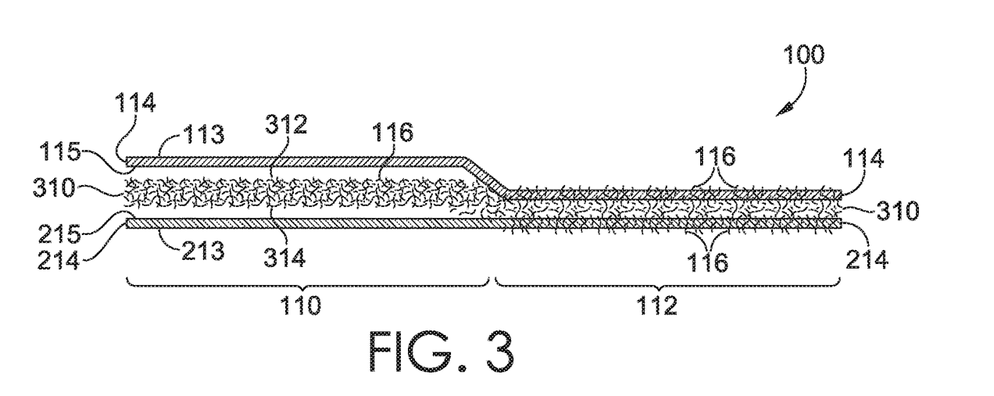
FIG. 3 illustrates a cross-sectional view of the example textile of FIG. 1 in accordance with aspects herein.

FIG. 3 depicts a cross-section of the textile 100 taken through the insulation zone 110 and the pile zone 112. As shown, the insulation zone 110 includes the first woven layer 114 and the second woven layer 214. The first woven layer 114 includes a first surface 113 and a second surface 115 opposite the first surface 113. In example aspects, the first surface 113 of the first woven layer 114 forms the first surface 101 of the insulation zone 110 of the textile 100. The second woven layer 214 also includes a first surface 213 and a second surface 215 opposite the first surface 213. In example aspects, the first surface 213 of the second woven layer 214 forms the second surface 201 of the insulation zone 110 of the textile 100.

A nonwoven layer 310 having a first surface 312 and a second surface 314 opposite the first surface 312 is positioned in a space formed between the first woven layer 114 and the second woven layer 214. More specifically, the first surface 312 of the nonwoven layer 310 is positioned adjacent to the second surface 115 of the first woven layer 114, and the second surface 314 of the nonwoven layer 310 is positioned adjacent to the second surface 215 of the second woven layer 214. As explained in additional detail below, the nonwoven layer 310 may include two or more nonwoven sheets that are entangled together. In example aspects, the fibers/filaments 116 of the nonwoven layer 310 may be formed from polyester fibers/filaments including recycled polyester fibers/filaments although other materials including natural materials are contemplated herein. In example aspects, the nonwoven layer 310 has a weight from about 150 grams per square meter (gsm) to about 250 gsm, from about 170 gsm to about 230 gsm, from about 190 gsm to about 210 gsm, or about 200 gsm. As used herein, the term "about" means within ±10% of an indicated value. The weight of the nonwoven layer 310 may be measured using, for example, ISO3801 testing standard.

In the insulation zone 110, the first woven layer 114, the nonwoven layer 310, and the second woven layer 214 are separate and distinct from each other such that a space, or a potential space, is maintained between the second surface 115 of the first woven layer 114 and the first surface 312 of the nonwoven layer 310 and between the second surface 215 of the second woven layer 214 and the second surface 314 of the nonwoven layer 310. Stated differently, in the insulation zone 110, the first woven layer 114, the nonwoven layer 310, and the second woven layer 214 are not affixed to each other or are unaffixed from each other. In the insulation zone 110, the spaces between the first woven layer 114, the second woven layer 214, and the nonwoven layer 310 trap heated air helping to insulate a wearer of a garment incorporating the textile 100. Additionally, spaces between the fibers/filaments 116 that form the nonwoven layer 310 also help to trap heated air further increasing the insulation features of the insulation zone 110.

The pile zone 112 of the textile 100 seamlessly extends from the insulation zone 110 as shown in FIG. 3. Stated differently, one or more warp or weft yarns in the insulation zone 110 extend continuously and without interruption into the pile zone 112. The pile zone 112 is created by an entanglement process whereby the fibers/filaments 116 of the nonwoven layer 310 are entangled with fibers, filaments, and/or yarns of the first woven layer 114 and the second woven layer 214. In example aspects, the integrity of the first woven layer 114 and the second woven layer 214 remains generally intact in the pile zone 112. For example, the warp and weft yarns that form the first woven layer 114 and the second woven layer 214 remain generally interwoven in the pile zone 112.

As shown in FIG. 3, the fibers/filaments 116 of the nonwoven layer 310 extend into the first woven layer 114. In some example aspects, the fibers/filaments 116 of the nonwoven layer 310 extend through the first woven layer 114 (i.e., extend through the first surface 113 of the first woven layer 114) such that the fibers/filaments 116 of the nonwoven layer 310 extend outwardly from the first surface 101 of the textile 100 in the pile zone 112. Similarly, the fibers/filaments 116 of the nonwoven layer 310 extend into the second woven layer 214. In some example aspects, the fibers/filaments 116 of the nonwoven layer 310 extend through the second woven layer 214 (i.e., extend through the first surface 213 of the second woven layer 214) such that the fibers/filaments 116 of the nonwoven layer 310 extend outwardly from the second surface 201 of the textile 100 in the pile zone 112. Due to the entanglement of the fibers/filaments 116 of the nonwoven layer 310 with the first woven layer 114 and the second woven layer 214 in the pile zone 112, the first woven layer 114 and the second woven layer 214 are bound or secured to the nonwoven layer 310 in the pile zone 112. The extension of the fibers/filaments 116 of the nonwoven layer 310 through the first woven layer 114 and the second woven layer 214 creates a pile or fleece-like texture on the first surface 101 and the second surface 201 of the textile 100 in the pile zone 112. This, in turn, provides a good hand feel and a pleasing aesthetic. Moreover, because the first woven layer 114 and the second woven layer 214 are present in the pile zone 112, the pile zone 112 also exhibits wind and/or rain resistant or repellant properties due to the tightly woven nature of the first woven layer 114 and/or the second woven layer 214.

Figure 4:
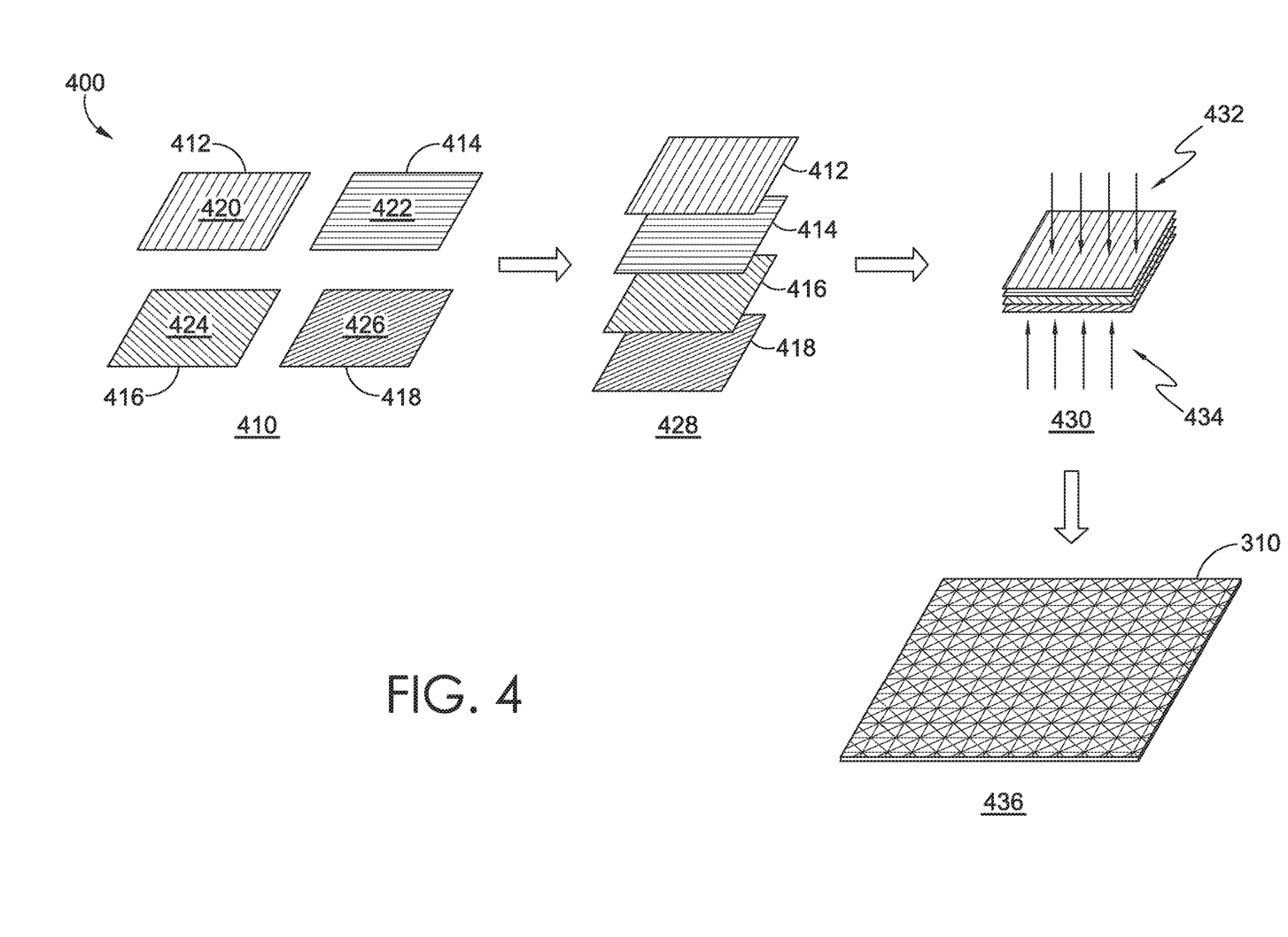
FIG. 4 illustrates a schematic of an example process for forming a nonwoven layer of the example textile of FIG. 1 in accordance with aspects herein.

FIG. 4 illustrates a schematic of an example process 400 of forming the nonwoven layer 310. At a step 410, two or more nonwoven sheets are provided. The two or more nonwoven sheets may each be formed of a web of fibers that has undergone a carding and lapping process that generally aligns the fibers in one or more common directions that extend along an x, y plane and that achieves a desired basis weight. The web of fibers may also undergo a light needling process or mechanical entanglement process that entangles the fibers of the web to a degree such that the web of fibers forms a cohesive structure that can be manipulated (e.g., rolled on to a roller, un-rolled from the roller, stacked, and the like). The nonwoven sheets may also undergo one or more additional processing steps such as printing (digital printing, sublimation printing, ink jet printing, and the like). In example aspects, four nonwoven sheets 412, 414, 416, and 418 are provided. Each of the four nonwoven sheets 412, 414, 416, and 418 may have a basis weight from about 35 gsm to about 65 gsm, from about 40 gsm to about 60 gsm, from about 45 gsm to about 55 gsm, or about 50 gsm to achieve a desired basis weight for the nonwoven layer 310 of from about 150 gsm to about 250 gsm. The nonwoven sheets 412, 414, 416, and 418 may respectively have a visual property 420, 422, 424, and 426 as indicated by the different shading patterns. The visual properties 420, 422, 424, and 426 may be imparted through a printing process (digital printing, sublimation printing, ink jet printing, and the like). Additionally or alternatively, the visual properties 420, 422, 424, and 426 may be imparted by using dope-dyed fibers/filaments to form the nonwoven sheets 412, 414, 416, and 418. Although the visual properties 420, 422, 424, and 426 are shown as different, it is contemplated herein that two or more of the visual properties may be the same. The visual properties 420, 422, 424, and 426 may include a color, a pattern, a combination of a color and a pattern, and the like.

At a step 428, the nonwoven sheets 412, 414, 416, and 418 are positioned or layered on top of each other to form a layered construction. Dependent upon a desired visual property of the nonwoven layer 310, the nonwoven sheets 412, 414, 416, and 418 may be arranged in a specific order although a random arrangement is also contemplated. At a step 430, a first entanglement process 432 is executed from a first side or surface of the layered construction through a second side or surface of the layered construction. Additionally, a second entanglement process 434 is executed from the second side or surface of the layered construction through the first side or surface of the layered construction. The first and second entanglement processes 432 and 434 may comprise a mechanical process such as needlepunching or hydroentangling although other entanglement processes are contemplated herein. The first and second entanglement processes 432 and 434 causes the fibers/filaments from each of the nonwoven sheets 412, 414, 416, and 418 to become entangled thus affixing the nonwoven sheets 412, 414, 416, and 418 together into a cohesive single layer structure. In example aspects, to achieve a desired integrity or cohesiveness of the nonwoven layer 310, the first and second entanglement processes 432 and 434 may be respectively executed a number of times such as two times up to seven times. In one example aspect, the first and second entanglement processes 432 and 434 may each be executed five times to achieve a desired cohesiveness while still having a desired loft of the nonwoven layer 310.

Step 436 depicts the nonwoven layer 310 formed from the entanglement of the fibers/filaments of the nonwoven sheets 412, 414, 416, and 418. The nonwoven layer 310 is shown as a continuous sheet without holes or apertures. It is contemplated herein that the nonwoven layer 310 may include holes or apertures. The holes or apertures may be formed during the entanglement process or they may be formed in a post-processing step using, for example, die cutting, laser cutting, water jet cutting, and the like.

Because the fibers/filaments from each of the nonwoven sheets 412, 414, 416, and 418 are entangled with each other, the visual property of the nonwoven layer 310 represents a composite or mixture of the respective visual properties 420, 422, 424, and 426 as indicated by the shading pattern in the step 436. In example aspects, the amount of entanglement between the different nonwoven sheets 412, 414, 416, and 418 influences the visual property of the resulting nonwoven layer 310. Using an illustrative example, the visual properties 420 and 424 may comprise the color blue and the visual properties 422 and 426 may comprise the color yellow. When a greater number of the first and second entanglement processes 432 and 434 are executed, the visual property of the nonwoven layer 310 may comprise a generally green color due to a greater degree of entanglement of the blue and yellow fibers and filaments. When a lesser number of the first and second entanglement processes 432 and 434 are executed, the visual property of the nonwoven layer 310 may comprise a heather color with blue areas intermixed with yellow areas.

In one example aspect, one of the nonwoven sheets such as the nonwoven sheet 412 or the nonwoven sheet 418, or an additional nonwoven sheet not shown may be added after the first and second entanglement processes 432 and 434 have been executed one or more times. By introducing a nonwoven sheet later in entanglement process, a visual property that is present on the introduced nonwoven sheet may be more distinct or less intermixed in the resulting nonwoven layer 310. In an illustrative example, the nonwoven sheet 412 may be introduced after the first and second entanglement processes 432 and 434 have been executed, for instance, three times. The visual property 420 in this example may comprise a pattern such as diagonal stripes. The first and second entanglement processes 432 and 434 may be executed, for example, two more times to produce the nonwoven layer 310. Because the nonwoven sheet 412 is subject to less entanglement than the remaining nonwoven sheets 414, 416, and 418, the visual property 420 is more distinct than the visual properties 422, 424, and 426 in the resulting nonwoven layer 310.

Figure 5:
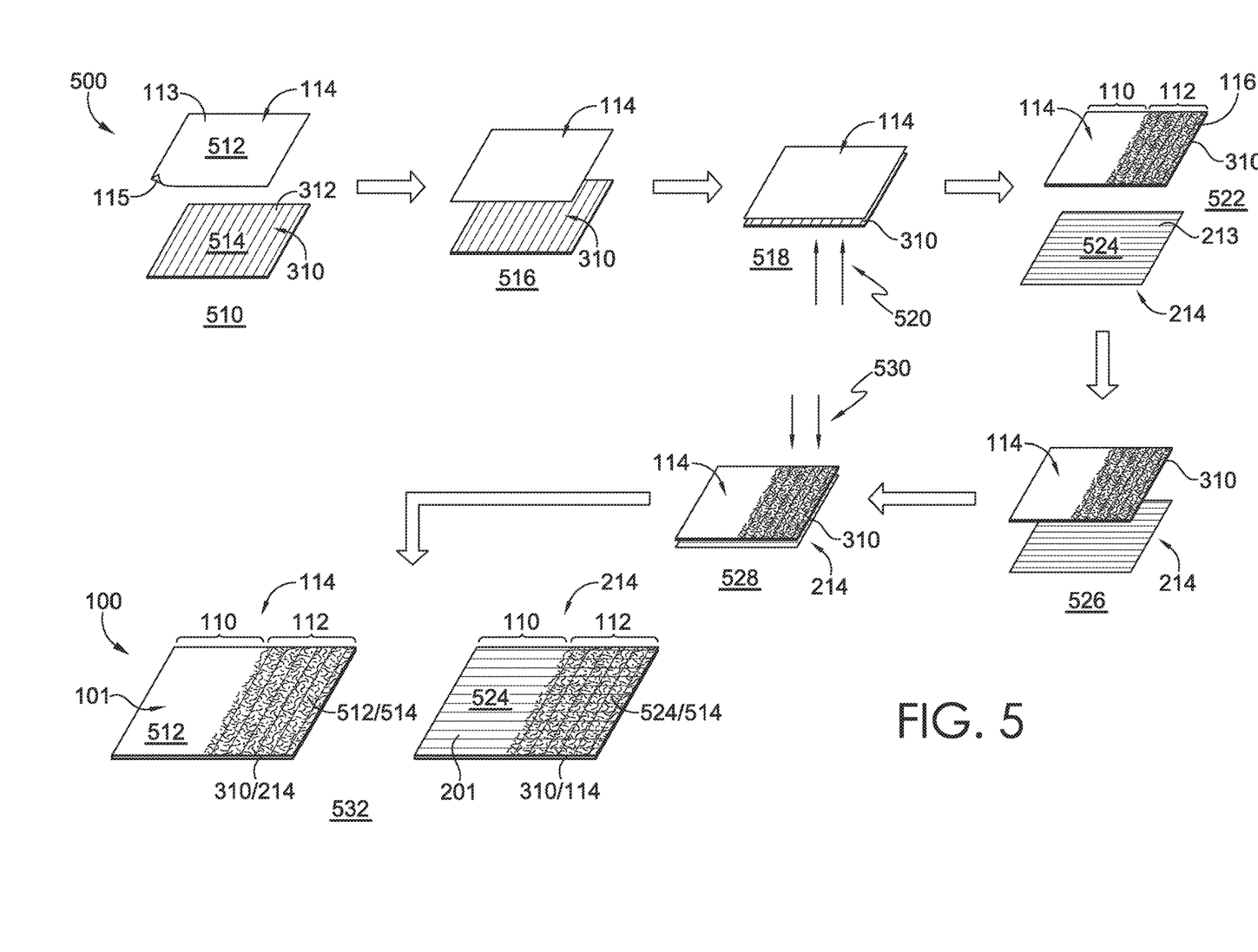
FIG. 5 illustrates a schematic of an example process for forming the example textile of FIG. 1 in accordance with aspects herein.

FIG. 5 depicts a schematic of an example process 500 for forming the textile 100. At a step 510, the first woven layer 114 and the nonwoven layer 310 are provided. The first woven layer 114 includes a visual property 512, and the nonwoven layer 310 includes a visual property 514 as indicated by the shading patterns. In example aspects, the visual property 512 may be the same or different from the visual property 514. The visual properties 512 and 514 may include a color, a pattern, a combination of a color and a pattern, and the like.

At a step 516, the second surface 115 of the first woven layer 114 is positioned adjacent to the first surface 312 of the nonwoven layer 310 to form a layered construction. At a step 518, a first entanglement process 520, such as needlepunching, is executed on a first area of the layered construction to at least partially form the pile zone 112. The first entanglement process 520 is executed in a direction from the nonwoven layer 310 toward the first woven layer 114 to entangle the fibers/filaments 116 from the nonwoven layer 310 with the fibers/filaments/yarns of the first woven layer 114. In example aspects, the first entanglement process 520 may be executed one time, although it is contemplated herein that the first entanglement process 520 may be executed more than one time. Executing the first entanglement process 520 in the direction from the nonwoven layer 310 toward the first woven layer 114 effectively secures or affixes the layers 114 and 310 together in the pile zone 112 due to greater fiber/filament availability in the nonwoven layer 310. In contrast, it has been found that executing an entanglement process in the direction from the first woven layer 114 toward the nonwoven layer 310 fails to secure the layers together because of less fiber/filament availability in the first woven layer 114. For instance, when needlepunching is used as the entanglement process, the needlepunching creates holes in the first woven layer 114 but generally fails to entangle the fibers/filaments/yarns from the first woven layer 114 with the fibers/filaments 116 of the nonwoven layer 310. It has also been found that needlepunching versus other mechanical entanglement processes such as hydroentangling, works better to secure the first woven layer 114 to the nonwoven layer 310. This is likely because hydroentanglement fails to generate enough force to push the fibers/filaments 116 of the nonwoven layer 310 into and through the first woven layer 114.

At a step 522, the first woven layer 114 that is entangled with the nonwoven layer 310 in the pile zone 112 is depicted. As further shown, because the fibers/filaments 116 from the nonwoven layer 310 comprise a visual property 514 (e.g., a color), the visual property 514 is visible on the first surface 113 of the first woven layer 114 in the pile zone 112 due to the entanglement of the fibers/filaments 116 of the nonwoven layer 310 with the fibers/filaments/yarns of the first woven layer 114. At the step 522, the second woven layer 214 is provided. In example aspects, the second woven layer 214 comprises a visual property 524. The visual property 524 may the same or different from the visual property 512 and/or the visual property 514. Similar to the above, the visual property 524 may include a color, a pattern, a combination of a color and a pattern, and the like.

At a step 526, the first surface 213 of the second woven layer 214 is positioned adjacent to the second surface 314 of the nonwoven layer 310 to form a layered construction. At a step 528, a second entanglement process 530, such as needlepunching, is executed on the area of the layered construction corresponding to the pile zone 112. The second entanglement process 530 is executed in a direction from the first woven layer 114 toward the second woven layer 214 to entangle the fibers/filaments 116 of the nonwoven layer 310, including the fibers/filaments 116 that are present within and on the first surface 113 of the first woven layer 114 with the fibers/filaments/yarns of the second woven layer 214. In example aspects, the second entanglement process 530 may be executed one time, although it is contemplated herein that the second entanglement process 530 may be executed more than one time. Similar to the first entanglement process 520, it has been found that needlepunching versus other mechanical entanglement processes such as hydroentangling, works better to secure the second woven layer 214 to the nonwoven layer 310 likely to the large amount of force able to be generated through the needlepunching process.

Step 532 depicts the first surface 101 and the second surface 201 of the textile 100. With respect to the first surface 101, and as noted above, the insulation zone 110 generally comprises the visual property 512 of the first woven layer 114, and the pile zone 112 generally comprises an intermixing of the visual property 512 of the first woven layer 114 and the visual property 514 of the nonwoven layer 310. With respect to the second surface 201 of the textile 100, the insulation zone 110 generally comprises the visual property 524 of the second woven layer 214, and the pile zone 112 generally comprises an intermixing of the visual property 514 of the nonwoven layer 310 and the visual property 524 of the second woven layer 214. The depiction of the process 500 is illustrative only and it is contemplated herein that the visual properties may vary from those shown. For example, in some aspects, the first woven layer 114 and/or the second woven layer 214 may be translucent or partially translucent such that the visual property 514 of the nonwoven layer 310 is partially visible through the first woven layer 114 and/or the second woven layer 214 in the insulation zone 110 of the textile 100. As well, the location, size, and shape of the insulation zone 110 and the pile zone 112 may vary from that shown.

The process 500 as described utilizes two woven layers such as the first woven layer 114 and the second woven layer 214 and a nonwoven layer, such as the nonwoven layer 310 to produce a textile that includes both insulation zones and pile zones in a seamless construction. The process 500 produces a varied aesthetic between the insulation zones and the pile zones on a particular surface of the textile, as well as a varied aesthetic on both the first surface and the second surface of the textile.

Figure 6:
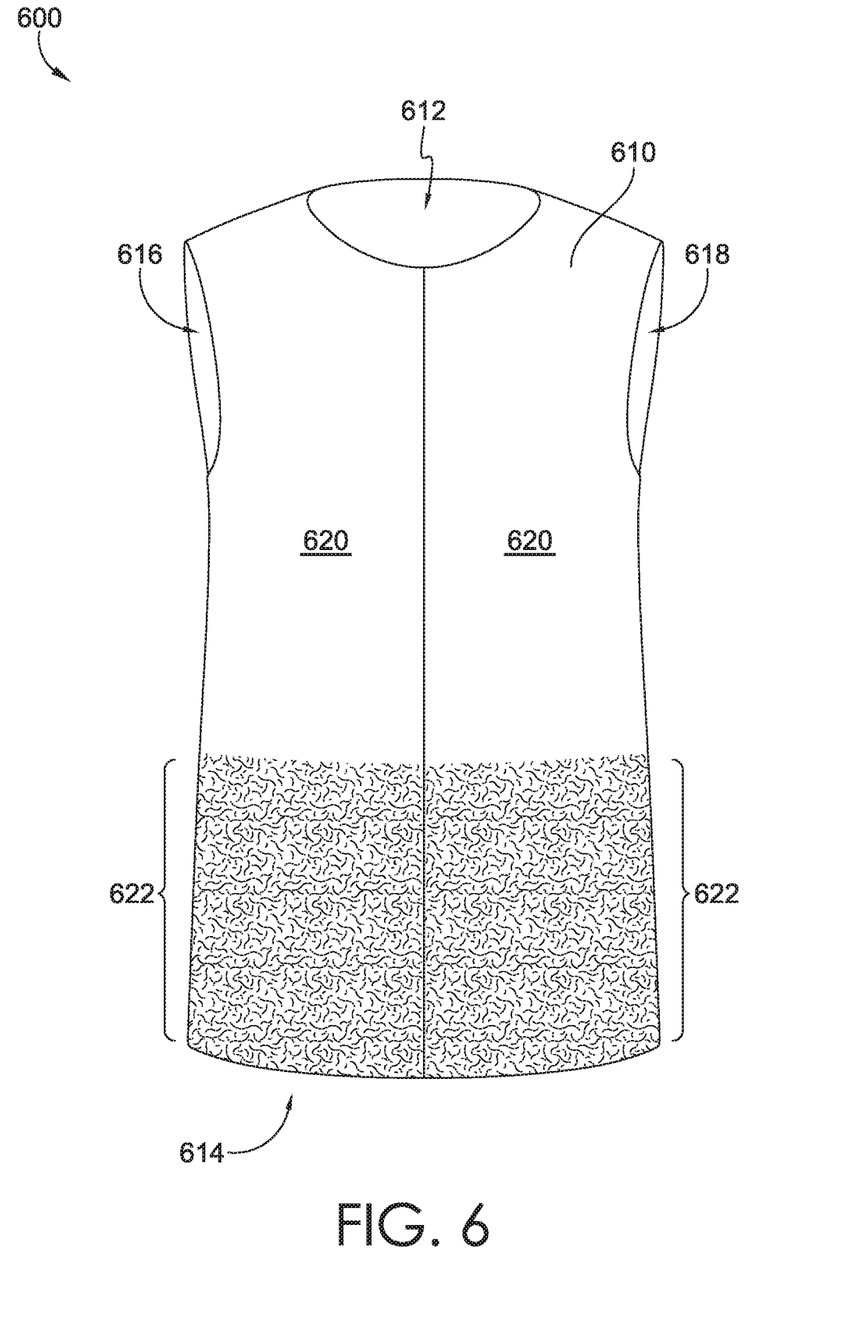
FIG. 6 illustrates an example upper-body garment incorporating the example textile of FIG. 1 in accordance with aspects herein.

The textile 100 may be incorporated into a number of different garments. For example, FIG. 6 depicts an upper-body garment 600 formed from the textile 100. The upper-body garment 600 is shown in the form of a vest having a torso portion 610, a neck opening 612, a waist opening 614, a first arm opening 616, and a second arm opening 618. Although shown as a vest, it is contemplated herein that the upper-body garment 600 may be in the form of a jacket with sleeves, a pullover, a shirt, a hoodie, and the like.

The upper-body garment 600 includes an insulation zone 620 corresponding to the insulation zone 110 of the textile 100 and a pile zone 622 corresponding to the pile zone 112 of the textile 100. The location of the insulation zone 620 and the pile zone 622 may be based on, for instance, heat maps of a human body. For example, the insulation zone 620 may be located on the upper-body garment 600 in areas corresponding to high heat loss of a wearer such as the upper front torso and the upper back torso, and the pile zone 622 may be located on the upper-body garment 600 in areas of less heat loss such as the lower front torso and the lower back torso. The size, shape, and number of the insulation zone 620 and the pile zone 622 on the upper-body garment 600 is illustrative only. In an example aspect, the upper-body garment 600 may include multiple insulation zones and multiple pile zones. Any and all aspects, and any variation thereof, are contemplated as being within aspects herein.

Figure 7:
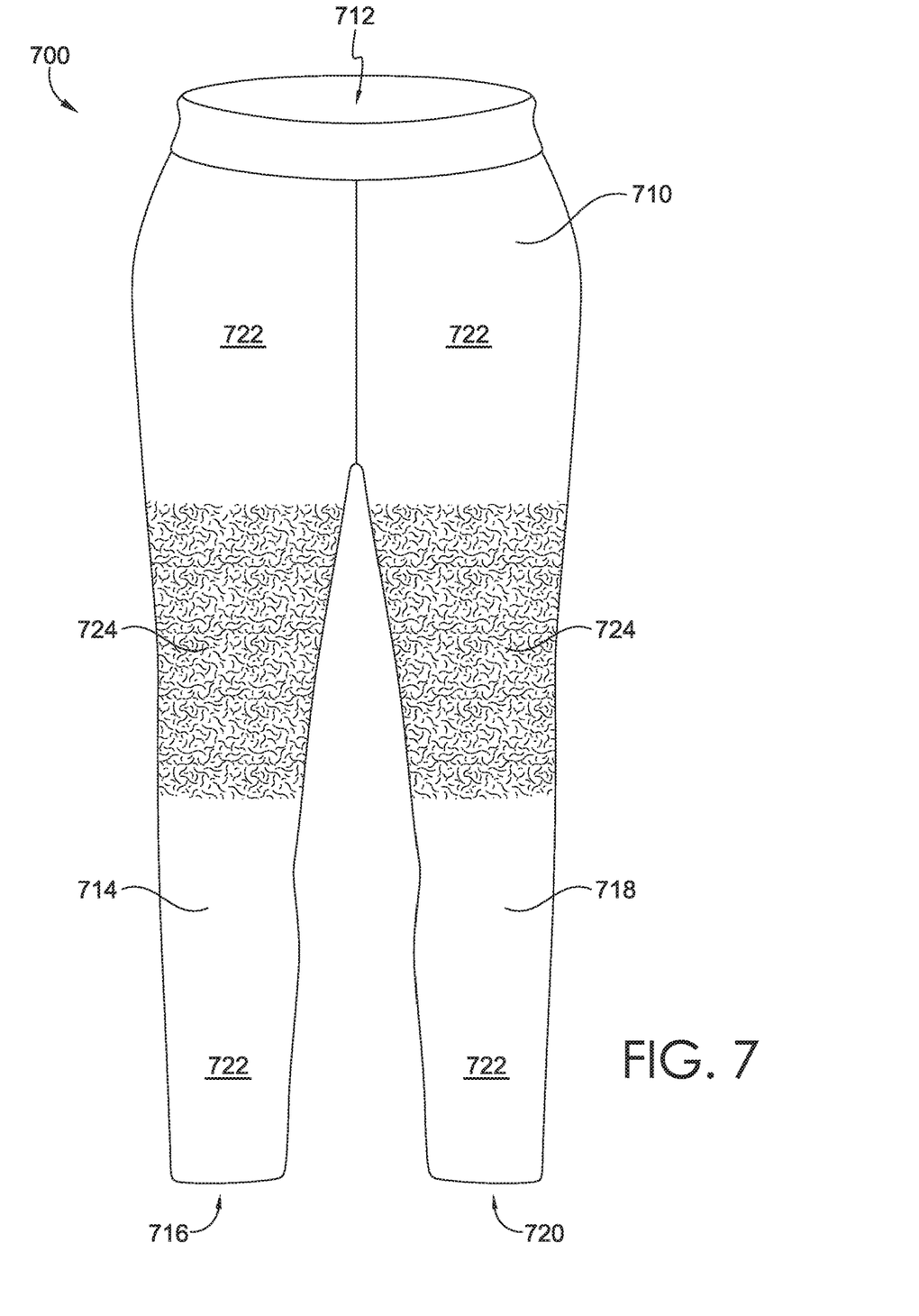
FIG. 7 illustrates an example lower-body garment incorporating the example textile of FIG. 1 in accordance with aspects herein.

FIG. 7 depicts a lower-body garment 700 formed from the textile 100. The lower-body garment 700 is in the form of a pant that has a torso portion 710 with a waist opening 712, a first leg portion 714 with a first leg opening 716, and a second leg portion 718 with a second leg opening 720. Although shown as a pant, it is contemplated herein that the lower-body garment 700 may be in the form of a short, a tight, a capri, a unitard, and the like.

The lower-body garment 700 includes insulation zones 722 located on the torso portion 710 and a lower aspect of the first leg portion 714 and the second leg portion 718. A pile zone 724 is located on an upper and mid aspect of the first leg portion 714 and the second leg portion 718. The location of the insulation zones 722 and the pile zones 724 may be based on heat maps of a human body. The size, shape, and number of the insulation zones 722 and the pile zones 724 is illustrative.

Although not shown, it is contemplated that the textile 100 may be used to form additional articles such as hats, gloves, extremity sleeves, socks, uppers, and the like.

Figure 8:
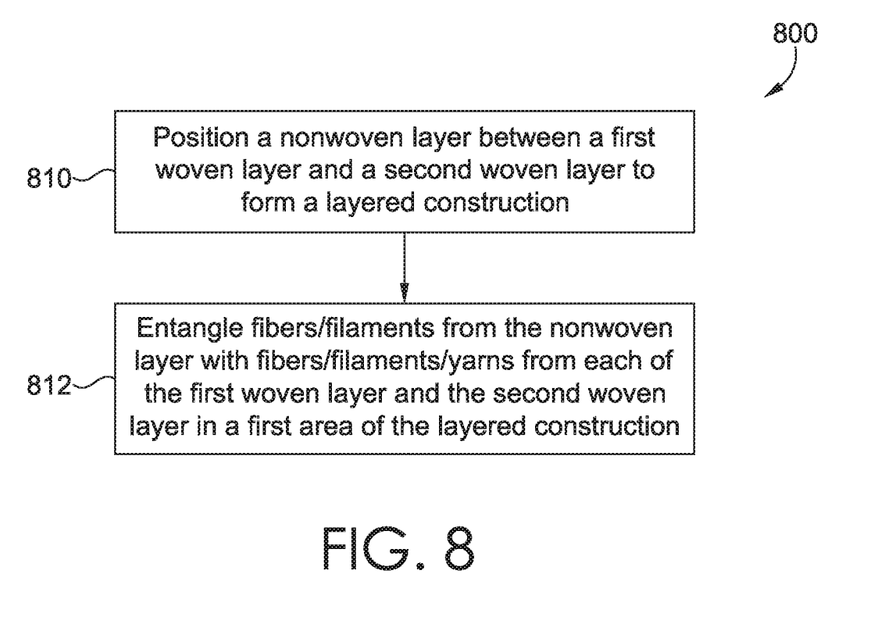
FIG. 8 illustrates a flow diagram of an example method of manufacturing the textile of FIG. 1 in accordance with aspects herein.

FIG. 8 is a flow diagram of an example method 800 of manufacturing a textile such as the textile 100. At a step 810, a nonwoven layer, such as the nonwoven layer 310 is positioned between a first woven layer, such as the first woven layer 114 and a second woven layer, such as the second woven layer 214 to form a layered construction. At a step 812, fibers and filaments from the nonwoven layer are entangled with fibers, filaments and/or yarns from each of the first woven layer and the second woven layer in a first area of the layered construction to form a pile zone. It is contemplated herein that in a second area of the layered construction corresponding to an insulation zone, the entanglement process is not executed such that the first woven layer, the second woven layer, and the nonwoven layer comprise separate and distinct layers.

Aspects herein further contemplate that the nonwoven layer is formed by entangling fibers and filaments from two or more nonwoven sheets together as described with respect to the process 400.

As illustrated in FIG. 5, the step 812 may include positioning the first woven layer adjacent to a first surface of the nonwoven layer and executing a first entanglement process in a direction from the nonwoven layer toward the first woven layer. After the first entanglement process is completed, the second woven layer is positioned adjacent to a second opposite surface of the nonwoven layer. A second entanglement process is then executed in a direction from the first woven layer toward the second woven layer to finish forming the pile zone.

As described with respect to the processes 400 and 500, the visual properties of the nonwoven sheets used to form the nonwoven layer may be selected to achieve a desired visual property for the nonwoven layer. In addition, the visual properties of the first woven layer and the second woven layer may be selected to achieve a desired visual property for the insulation zone(s) and the pile zone(s) on the first surface of the textile as well as a desired visual property for the insulation zone(s) and the pile zone(s) on the second opposite surface of the textile. The visual properties of the textile may also be adjusted based on the degree of entanglement of the nonwoven sheets used to form the nonwoven layer and the degree of entanglement of the nonwoven layer with each of the first woven layer and the second woven layer.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A textile comprising:
    an insulation zone comprising a first woven layer, a second woven layer, and a nonwoven layer that is positioned between the first woven layer and the second woven layer and that comprises a first plurality of fibers, each of the first woven layer and the second woven layer being unaffixed from the nonwoven layer in the insulation zone; and
    a pile zone extending from the insulation zone, the pile zone comprising the first woven layer, the second woven layer, and the nonwoven layer that is positioned between the first woven layer and the second woven layer, wherein the first plurality of fibers extends into and through each of the first woven layer and the second woven layer such that the first woven layer and the second woven layer are bound to the nonwoven layer in the pile zone, and wherein at least some fibers of the first plurality of fibers extend outwardly away from a surface plane of the first woven layer and comprise piles comprising a fleece texture.

2. The textile of claim 1, wherein the nonwoven layer comprises two or more nonwoven sheets, and wherein fibers from each of the two or more nonwoven sheets are entangled with each other.

3. The textile of claim 2, wherein a first nonwoven sheet of the two or more nonwoven sheets comprises a first visual property, and wherein a second nonwoven sheet of the two or more nonwoven sheets comprises a second visual property different from the first visual property.

4. The textile of claim 3, wherein the first visual property comprises a first color, and wherein the second visual property comprises a second color.

5. The textile of claim 3, wherein the first visual property comprises a first pattern, and wherein the second visual property comprises a second pattern.

6. The textile of claim 1, wherein the nonwoven layer has a weight from about 180 grams per square meter (gsm) to about 220 gsm.

7. A garment comprising:
an insulation zone comprising a first woven layer, a second woven layer, and a nonwoven layer that is positioned between the first woven layer and the second woven layer and that comprises a first plurality of fibers, each of the first woven layer and the second woven layer being unaffixed from the nonwoven layer in the insulation zone; and
a pile zone extending from the insulation zone and comprising water resistance, wind resistance, or a combination thereof and comprising a fleece aesthetic, the pile zone comprising the first woven layer, the second woven layer, and the nonwoven layer that is positioned between the first woven layer and the second woven layer, wherein the first plurality of fibers extends into and through each of the first woven layer and the second woven layer such that the first woven layer and the second woven layer are bound to the nonwoven layer in the pile zone.

8. The garment of claim 7, wherein both of the first woven layer and the second woven layer are unaffixed from the nonwoven layer in the insulation zone.

9. The garment of claim 7, wherein the nonwoven layer has a visual property different from a visual property of the first woven layer, different from a visual property of the second woven layer, or different from both the visual property of the first woven layer and the visual property of the second woven layer.

10. The garment of claim 7, wherein the nonwoven layer comprises two or more nonwoven sheets, and wherein fibers from each of the two or more nonwoven sheets are entangled with each other.

11. The garment of claim 10, wherein a first nonwoven sheet of the two or more nonwoven sheets comprises a first visual property, and wherein a second nonwoven sheet of the two or more nonwoven sheets comprises a second visual property different from the first visual property.

12. The garment of claim 7, wherein the nonwoven layer has a weight from about 180 grams per square meter (gsm) to about 220 gsm.

13. The garment of claim 7, wherein the insulation zone is positioned on the garment in areas corresponding to high heat loss areas of a wearer when the garment is in an as-worn configuration.

14. A method of manufacturing a garment comprising:
positioning a nonwoven layer between a first woven layer and a second woven layer to form a layered construction, wherein the nonwoven layer comprises one or more nonwoven sheets; and
entangling a first plurality of fibers from the one or more nonwoven sheets with each of the first woven layer and the second woven layer such that each of the first woven layer and the second woven layer are secured to the one or more nonwoven sheets in a first area of the layered construction, wherein each of the first woven layer and the second woven layer remain unaffixed from the nonwoven layer in a second area of the layered construction, and wherein at least some fibers of the first plurality of fibers extend outwardly away from a surface plane of the first woven layer and comprise piles comprising a fleece texture.

15. The method of manufacturing the garment of claim 14, wherein the nonwoven layer is formed by positioning two or more nonwoven sheets adjacent to each other and entangling fibers from each of the two or more nonwoven sheets with each other using an entanglement process.

16. The method of manufacturing the garment of claim 15, wherein the entanglement process is executed in a direction from a first surface of the nonwoven layer toward a second surface of the nonwoven layer, and in a direction from the second surface of the nonwoven layer toward the first surface of the nonwoven layer.

17. The method of manufacturing the garment of claim 14, wherein entangling the first plurality of fibers from the nonwoven layer with each the first woven layer and the second woven layer comprises:
positioning the first woven layer adjacent to a first surface of the nonwoven layer;
executing a first entanglement process in a direction from the nonwoven layer toward the first woven layer;
subsequently positioning the second woven layer adjacent to a second opposite surface of the nonwoven layer; and
executing a second entanglement process in a direction from the first woven layer toward the second woven layer.

18. The method of manufacturing the garment of claim 14, wherein the nonwoven layer has a weight from about 180 grams per square meter (gsm) to about 220 gsm.

19. The textile of claim 1, wherein at least one of the first and second woven layers comprises a durable water repellant finish.

20. The garment of claim 7, wherein at least one of the first and second woven layers comprises a durable water repellant finish.

* * * * *

UNITED STATES PATENT AND TRADEMARK OFFICE
CERTIFICATE OF CORRECTION

| | | |
|---|---|---|
| PATENT NO. | : 12,427,745 B2 | Page 1 of 1 |
| APPLICATION NO. | : 17/203051 | |
| DATED | : September 30, 2025 | |
| INVENTOR(S) | : Baron C. Brandt, Dallas Lund and Andrea J. Staub | |

It is certified that error appears in the above-identified patent and that said Letters Patent is hereby corrected as shown below:

In the Specification

Column 1, Line 7:
The line reading "This application, Ser. No. 17/203,035 and titled 'Textile" should read --This application, Ser. No. 17/203,051 and titled 'Textile--

Signed and Sealed this
Sixteenth Day of December, 2025

John A. Squires
*Director of the United States Patent and Trademark Office*